US009893904B2

(12) United States Patent
Roberts et al.

(10) Patent No.: US 9,893,904 B2
(45) Date of Patent: Feb. 13, 2018

(54) RULE-BASED MESSAGING AND DIALOG ENGINE

(71) Applicant: Palo Alto Research Center Incorporated, Palo Alto, CA (US)

(72) Inventors: Michael Roberts, Los Gatos, CA (US); Victoria M. E. Bellotti, San Francisco, CA (US); Shane P. Ahern, Foster City, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 479 days.

(21) Appl. No.: 13/894,306

(22) Filed: May 14, 2013

(65) Prior Publication Data

US 2014/0344709 A1    Nov. 20, 2014

(51) Int. Cl.
*G06F 3/048* (2013.01)
*H04L 12/18* (2006.01)
*G06F 17/30* (2006.01)

(52) U.S. Cl.
CPC .... *H04L 12/1859* (2013.01); *G06F 17/30654* (2013.01); *Y10S 707/99933* (2013.01)

(58) Field of Classification Search
CPC . G06Q 10/107; H04L 12/581; H04L 12/1859; Y10S 707/99933; G06F 17/30654

USPC .......................................................... 715/752
See application file for complete search history.

(56) References Cited

U.S. PATENT DOCUMENTS

| 7,337,158 | B2 * | 2/2008 | Fratkina et al. | 706/45 |
| 2013/0046781 | A1 * | 2/2013 | Frankel et al. | 707/769 |
| 2013/0124627 | A1 * | 5/2013 | Cathcart et al. | 709/204 |

* cited by examiner

*Primary Examiner* — Ajay Bhatia
*Assistant Examiner* — Alex Olshannikov
(74) *Attorney, Agent, or Firm* — Shun Yao; Park, Vaughan, Fleming & Dowler LLP (57) ABSTRACT

One embodiment of the present invention provides a system for generating a message. During operation, the system receives user interaction event data. The user interaction event data describes explicit or implicit interactions of a user with a web application and/or mobile application. Next, the system modifies a graph describing the user's current context associated with the user based on an analysis of the user interaction event data, as interpreted by the system learning from previous processing of user interaction event data. The context graph includes information about the user's state, behavior, and interests, and some or all portions of the context graph may be shared between users. The system determines a set of rules associated with a group of users that includes the user, and then applies the determined set of rules to any context graph associated with the user to generate the message.

20 Claims, 4 Drawing Sheets

RULE-BASED MESSAGING AND DIALOG ENGINE

BACKGROUND

Field

This disclosure is generally related to machine-based financial and health advising. More specifically, this disclosure is related to a method and system for generating customized messages based on observed user interactions with a website and user response to dialog.

Related Art

High net worth individuals frequently have financial and health advisors who guide them through the complex choices available in life in order to obtain maximum benefit from their investments and lifestyle choices. They may also have a life coach to advise them on career moves and a personal trainer or a nutritionist to advise them on exercise and diet. However, advice for individuals without such extensive resources is frequently non-existent or limited and lacking in concrete suggestions targeted to an individual's personal data.

Some web sites offer tailored advice to individuals interested in financial planning. However, such websites typically require a human advisor to provide the personal advice, which may be an additional expense not acceptable to the average employee or investor.

SUMMARY

One embodiment of the present invention provides a system to generate a message. During operation, the system receives user interaction event data. The user interaction event data describes explicit or implicit interactions of a user with a web application and/or mobile application through a computer system, a mobile device, or other electronic device. Next, the system modifies a graph describing the user's current context associated with the user, based on an analysis of the user interaction event data. The analysis involves applying machine-learning techniques to prior user interaction event data. The context graph includes information about the user's state, behavior, and interests, and some or all portions of the context graph may be shared between users. The system determines a set of rules associated with a group of users that includes the user, and applies the determined set of rules to any context graph associated with the user to generate the message.

In a variation on this embodiment, the system generates a sequence of related messages that suggest a user perform an action. The system tracks user responses to the related messages with a state machine, and generates a new message based on the tracked user responses and the state of the user's context graph. The system then updates the context graph using data from the state machine.

In a variation on this embodiment, the system selects a message item associated with the set of rules, and generates the message based on the selected message item.

In a variation on this embodiment, the message is retrieved by a collector/presenter and ranked with other messages to facilitate choosing a message for presentation to the user.

In a variation on this embodiment, the method further comprises: receiving the user interaction event data from a collector/presenter that monitors explicit or implicit user interactions with the web application and/or mobile application.

In a variation on this embodiment, the system sends a series of related messages to the user, and engages the user in a dialog. Then, the system updates the context graph with data from the dialog and/or modifies the message based on the dialog and state of the user's context graph.

In a variation on this embodiment, the rules are conditional statements referencing nodes and edges of the context graph.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of automatically generating customized messages for a user by analyzing user behavior and activity with a rule-based messaging engine and engaging the user in a dialog to customize messages.

A messaging system as disclosed herein provides machine-generated financial and/or health advice by collecting and storing data associated with user behavior and activity, and analyzing the user information with a combination of rules to generate messages. A message can be, for example, "You should increase your contributions to your 401(k) by 20%." Messages can also be questions, offers, information, or any other type of communication. Rules are conditional statements that the system applies against data representing user activities in order to generate messages.

The system obtains data describing the user's explicit or implicit interactions with a human resource website (or health care provider or customer support or any other type of interactions, including interactions with any web application and/or mobile application), and publishes the data to a number of server components that analyze, store, or process the data to generate messages. The system may obtain the interaction data from a collector/presenter system that monitors the user's website interactions. The system may analyze the user interaction event data and write the user activity and behavior information into a context graph, as interpreted by the system learning from previous processing of user interaction event data. A context graph is an in-memory model that stores facts and assumptions about a user's state, behavior and interests. The system includes a learning mechanism for interpreting the user interaction event data to update the context graph. The system may learn from training data that includes past processing of user interaction event data in order to map the input event data to context graph modifications. The system may use information from the context graph to generate messages. The system may also store the user interaction data as low-level events in a database and use the event data to modify the context graph and/or generate messages.

Certain user interaction events may cause the system to modify a user's context graph, and such modifications may cause the system to trigger conditional statements called rules. These rules determine how a rule-based recommender generates messages based on event and/or context graph information. The recommender applies a set of rules against events and/or the context graph to generate a message in the form of financial advice. As part of generating the message, the system may also engage the user in dialog. By engaging the user in dialog and observing user behavior and responses, the system can verify assumptions about user behavior, further refine the user's context graph, customize the message, and/or generate additional messages that may be persuasive to the user.

In one embodiment, a messaging system may include a cluster of messaging servers executing concurrently to allow the messaging system to scale in order to handle greater loads. Each of the messaging servers in the cluster may store and manage user information, and start and stop user sessions. A user session includes de-serialized information for a user, and can provide messages for the user. De-serialized information includes data structures, such as the context graph, that have been instantiated in memory. The messaging system may include a load balancer to distribute user sessions among the messaging servers, and to direct all event data and messaging traffic associated with one user back to the same messaging server.

In some embodiments, rather than a rule-based messaging engine, the messaging engine may also be numerically-based. A messaging system may also use a machine-learning approach to generate messages based on user interactions. For example, the system can apply various machine-learning techniques to prior received user interaction data to learn a user's habits and preferences.

Some implementations may also include a content development system that allows administrative personnel to interactively develop and test messaging systems. Various implementations may also include a web-based content authoring system to define parameters of rules. For example, one implementation may include a high-level rule editor to enable non-programmers to design and generate rules.

Although this disclosure uses website interaction data as exemplary event data, embodiments of the present invention may also collect data regarding user interactions with other computer systems, such as software applications. Embodiments of the present invention are not limited to any particular computer system which may provide user interaction event data.

System Architecture

Figure 1:
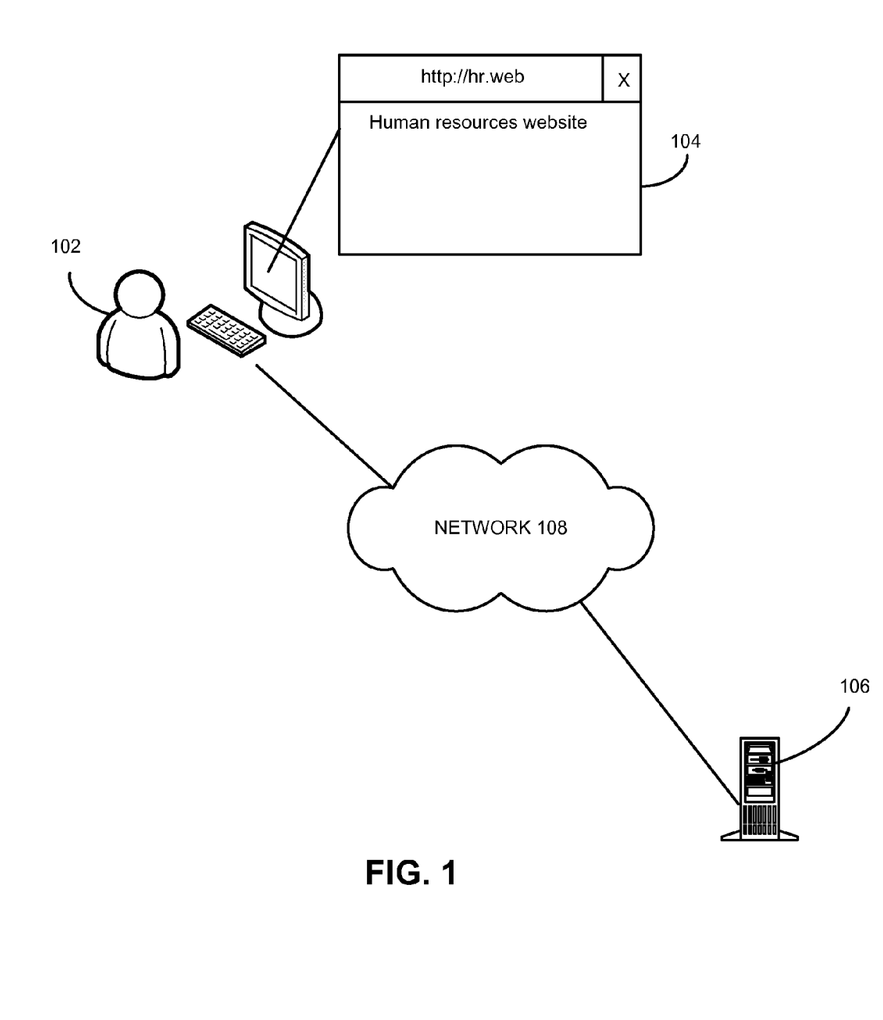
FIG. 1 presents a block diagram illustrating a messaging system for collecting event data which describes a user interacting with a human resources website, according to an embodiment.

FIG. 1 presents a block diagram illustrating a messaging system for collecting event data which describes a user interacting with a human resources website, according to an embodiment. In the example illustrated in FIG. 1, a user 102 interacts with a human resources website 104. The user may interact with the human resources website 104 on a computer system, mobile device, or other electronic device. The user may review 401(k) account information, financial advice, health plans, and other employee-related data. A server 106 monitors the user's interaction with human resource website 104 over a network 108. Based on the interaction event data, server 106 may modify a context graph associated with user 102. The context graph may describe the user's current context. For example, server 106 may modify the context graph to store data describing user state and interactions with a health benefits system, healthcare providers, etc. The changes to the context graph may cause a dependency system to apply rules to generate messages for user 102.

A dependency system is a component of a messaging system that monitors changes made to the context graph as well as incoming events, and triggers re-evaluation of rules by a rule-based recommender to update and/or generate new messages. The messaging system may engage the user in a dialog to further modify the context graph for improved messages, and then a collector/presenter retrieves the messages and presents the messages to user 102.

Figure 2:
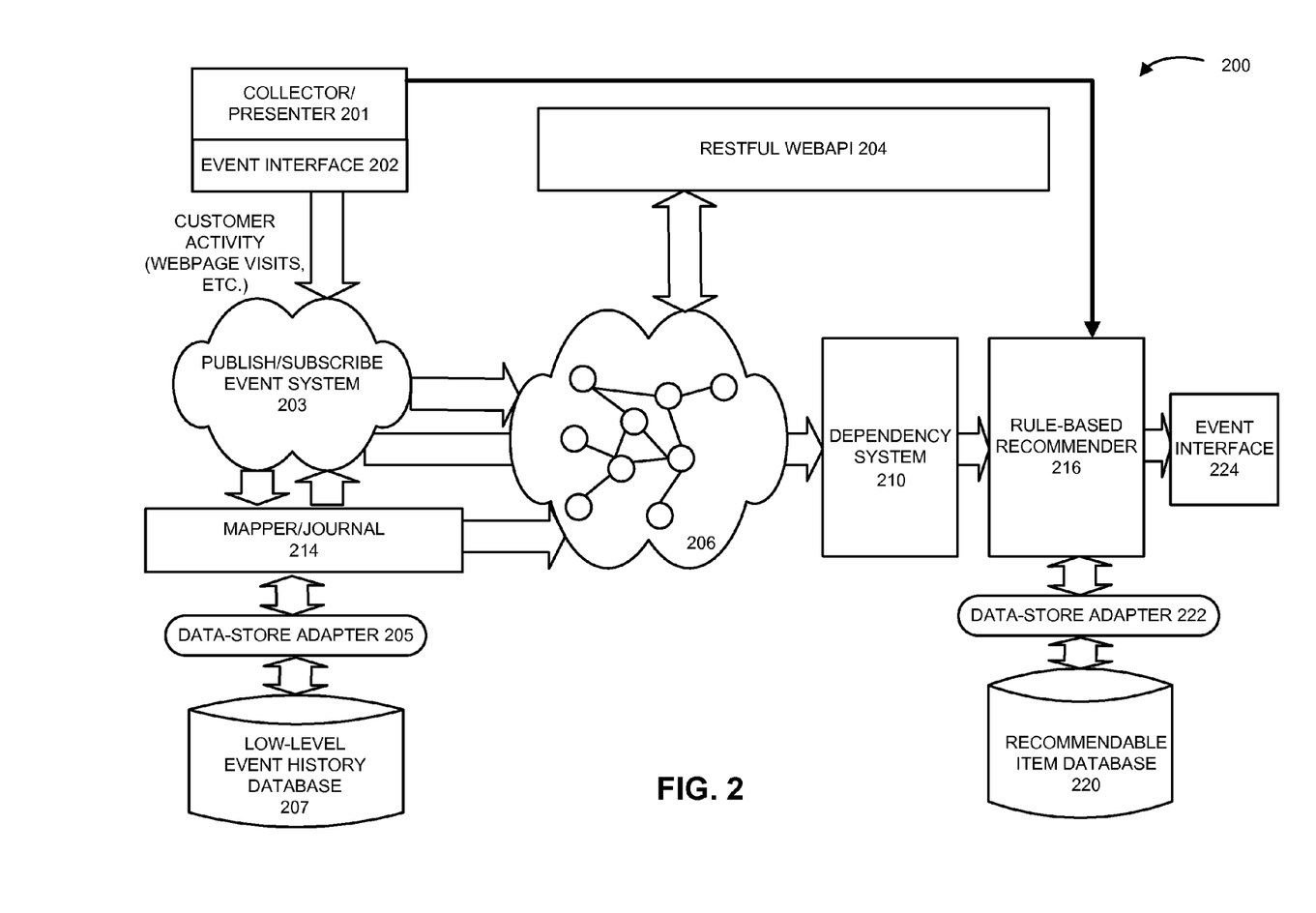
FIG. 2 presents a block diagram illustrating an exemplary architecture of a message system, according to an embodiment.

FIG. 2 presents a block diagram illustrating an exemplary architecture of a message system, according to an embodiment. The operation of a messaging system 200 includes receiving user interaction events from a collector/presenter and publishing events to subscribers that are component parts of messaging system 200. Some of the subscribers are a mapper/journal component, a context graph, and a dependency system. The mapper/journal component maps events into semantic relationships in a context graph and records events to a low-level event history database. The mapper and a representational state transfer (REST) Web application programming interface (RESTful WebAPI) may modify the context graph, and the dependency system provides context graph change information to a rule-based recommender. A RESTful WebAPI is a web service implemented using HTTP and the principles of REST. REST is a style of software architecture for distributed systems such as the World Wide Web. Applications conforming to the REST constraints are "RESTful." The rule-based recommender generates messages from a recommendable item database and sends the messages back to the collector/presenter. Messaging system 200 may also include a dialog system to engage the user in a dialog, which may result in modifying context graph 206, thereby facilitating improved messages for the user.

As illustrated in FIG. 2, a collector/presenter 201 collects user interaction data and sends the user interaction data to messaging system 200 through event interface 202, a RESTful WebAPI 204, and/or a rule-based recommender 216. Such interactions include customer activity on a human resources website or any other type of website. The system may collect data on, for example, the type of human resource web pages (or any other type of web pages) that the user visits, and the time that the user spends on particular web pages.

Event interface 202 sends events received from collector/presenter 201 to publish/subscribe event system 203. Publish/subscribe event system 203 may send events to a mapper/journal 214, a context graph 206, and a dependency system 210. By using multiple, concurrent queues to send the events to various server components, messaging system 200 may write the event data to storage and/or publish the event data to facilitate generating messages.

Messaging system 200 may write the data to storage for subsequent analysis. Messaging system 200 may transfer event information from event interface 202 to a data-store adapter 205. Such event information may be transferred via a real-time event stream, which may include streams of real-time events for each user. Messaging system 200 may use data store adapter 205 to record events to low-level storage, such as low-level event history database 207. Low-level event history database 207 can be, for example, a NoSQL database storing low-level event history information.

When messaging system 200 receives events at RESTful WebAPI 204, messaging system 200 can convert the events into internal message queue events. Using a message queuing architecture on messaging system 200 allows the system to decouple event reception from event processing. Any module on messaging system 200 can subscribe to the message queue, either using a user identifier or otherwise.

In one implementation, messaging system 200 may use RabbitMQ for message queuing functionality. RabbitMQ is open source message broker software that implements the Advanced Message Queuing Protocol (AMQP) standard. The system may use RabbitMQ messages to transmit events and data between server components. After a server component receives a RabbitMQ message, the server component may transform the message into a Java object. Note that RabbitMQ is one possible message queuing system and embodiments of the present invention are not limited to using RabbitMQ.

Each user is associated with a context graph 206 that describes their current state. Context graph 206 is a per-user, in-memory, graph-based model that stores facts and assertions about user state, behavior and actions. Dependency system 210 determines events and changes to the context graph that trigger reevaluation of rules. Dependency system 210 may convert events and changes in context graph 206 to a uniform internal format, and cause rule-based recommender 216 to apply rules to the converted results. The rules access recommendable items in a recommendable item database 220 through a data-store adapter 222.

A recommendable item is an item of content that may be recommended to a user (e.g., a webpage, a text snippet, or the beginning of a dialog aimed at encouraging accomplishment of some health, financial, or other goal). Each recommendable item may be accessed by one or more rules. Embodiments of the present invention may include a Web API for inserting, querying, and modifying recommendable items in a recommendable item data store. The data store holds all recommendable items available in the messaging system.

Rule-based recommender 216 generates messages using one or more rules, and makes the messages available through event interface 224. Collector/presenter 201 may then retrieve messages through event interface 224. The components and systems illustrated in FIG. 2 are described below in greater detail.

Rules are conditional statements that relate certain conditions in context graph 206 and incoming events to messages. A rule can reference properties of objects in events or context graph 206. For example, a rule may be defined by a combination of conditional elements such as "Connected(a, b)" or "LessThan(c,d)," where c and d are nodes of context graph 206. The system can support a number of different types of rules. Note that rule authors can specify types and parameters for rules, and relationships between rules.

When a rule fires, the recommendable items referred to by the rule becomes the message output. Rules for generating messages may be organized into rule sets. A rule set is a set of messaging rules. Rule sets are associated with user groups.

A user group is a group of users for which a messaging system applies a common rule set to generate messages. Each user group is associated with a set of rules and their associated recommendable items. Users can belong to more than one user group. For example, all the users for the client A organization belongs to the client A group. As another example, a group may include all users who are part of a diabetes maintenance group.

Collector/presenter 201 performs multiple functions, including collecting user interaction data, retrieving messages from the messaging system, and presenting the retrieved messages to users. Collector/presenter 201 may monitor user interactions with a human resources web server to collect the user interaction data. Collector/presenter 201 may retrieve messages from messaging system 200 through event interface 224.

Collector/presenter 201 may rank all pending messages for a user from multiple messaging systems and/or messaging servers. Collector/presenter 201 determines which messages to send to user 102. A ranking system may assign ranking values to messages such that messages are positioned according to ranking in a priority list. Embodiments of the present invention may include a schema for ranking messages which may be a function of urgency, importance, deviance, and/or context. Urgency means proximity to a deadline. Importance means a score which can be assigned to a message a priori by a specialist or human resource person. Deviancy means the degree to which and direction in which a user is deviant from an ideal range on the behavior in question. Context means which channel a user is in, metadata associated with content they are viewing, user actions and history, and other miscellaneous contextual data.

In one embodiment, collector/presenter 201 may post events and modifications via a web interface, such as event interface 202 and/or RESTful WebAPI 204. Collector/presenter 201 can upload data to the messaging server either by uploading in real time or using bulk upload. For continuous, real-time events upload, collector/presenter 201 can post JavaScript Object Notation (JSON) messages to RESTful WebAPI 204. RESTful WebAPI 204 can identify the real-time events with a userid for the user the data is associated with. Real-time upload of events allows collector/presenter 201 to continuously update user state for real-time applications.

For bulk uploads of user data collector/presenter 201 can use HTTP POST to upload large data files (e.g., from a database). The server can process such bulk uploads into a server-side data store. Note that collector/presenter 201 can use bulk upload for large blocks of data such as screenshots.

Postings to a web interface may include parameters such as userid, event type, date/time, and metadata. Userid is the identifier for user-generated events. Event type is the type information for the event. Date/time is the date and time the event occurred. The parameters may also include other metadata that describes the event. For example, if the event is a page visit, additional metadata parameters may define the page content. One may associate metadata with an event or a webpage. The system may also infer metadata. For example, the system may analyze text to extract keywords, or the system may count the number of times a page is visited to infer its level of interest to the user. After events are posted to messaging system 200, the system may transfer the events into message queue events. The system may use the message queue to distribute events to participating messaging servers executing concurrently in a cluster.

In a messaging system, there can be a number of messaging servers executing concurrently. Each messaging server may instantiate a number of context graphs, with one context graph serving each user. The server may also instantiate a set of rule systems, with one or more rule systems for each group or user. The server utilizes the context graphs and rule systems to generate messages. The server determines the rules in each rule system by computing the union of the rule sets associated with groups to which a user belongs.

The server can simultaneously execute a number of user sessions, each of which generates messages for an associated user. A user session in execution includes de-serialized information for a user. A user session in execution may include a de-serialized context graph, an executing rule system, and a dependency system. A de-serialized context graph is one that is instantiated in memory instead of being stored on disk. Note that the system may also deserialize a context graph independent of a user session. Each user session in the system has a unique session identifier, which is created whenever the user is initialized in memory. The user session listens for events, whether received in real-time or asynchronously, and allows for generating messages with the dependency system and rule system.

The system initializes a user with a StartUser command, which informs a server which user events to listen for. When the system activates a user in a user session, the messaging server publishes the activation on a co-ordination channel, which all messaging server instances are subscribed to. This allows each server in the system to keep track of the location of users within other servers, which may facilitate social features. Such social features may include, for example, the system generating a message using other users' data. For a user that is not actively executing, the system can mark the user with a reminder to refresh the user's messages. The system can then refresh the user's messages when the user is subsequently activated.

The system may utilize the messaging server instances independently or in-concert. In one embodiment, a sticky load balancer can serve a cluster of messaging server instances operating in-concert. The load balancer is sticky because it consistently sends all requests in a user session to the same server. The system may also direct traffic for the cluster of nodes to the load balancer (e.g., Kemp or LoadBalancer.org), which routes traffic to the messaging servers. Each messaging server listens to an incoming event stream/channel for events associated with users that have instantiated user sessions on the messaging server. Furthermore, all the servers in the same cluster may access the same message queues (e.g., RabbitMQ), providing coordination between the servers.

The system can consistently direct all traffic from the same Internet Protocol (IP) address to the same node, so that the data structures (e.g., context graph 206) instantiated to generate messages for a particular user remain in the memory of the same machine for the duration of a user session. The messaging system may also utilize an external facing load balancer provisioned with a RESTful WebAPI for delivering messages to collector/presenter 201.

Note that each messaging server may have access to a backing database (e.g., implemented in MongoDB) used to persistently store information about users, events, messages, and other similar entities. The messaging servers may persist information to the backing database when a user session terminates.

In one embodiment, the system may store context graph data describing each user to facilitate generating messages. Each user is associated with a context graph 206 that describes their current state. Context graph 206 is a per-user, in-memory, graph-based model that stores facts and assertions about user behavior and actions. Context graph 206 is a database of domain-specific prior knowledge about the user that the system uses to generate messages. For example, context graph 206 may include data relating to the page viewing habits of the user. Such data may include that a user tends to view the value of his 401(k) once a week, or that the user tends to purchase mutual funds instead of stocks.

Context graph 206 functions as a storage component of a generalized user model. A user model describes predicted current and future activities and interests for a user. The system can store data in context graph 206 using a type-less approach to data storage. Context graph 206 may store data according to different data models, including data models for entity-relationship data and unstructured data. Embodiment of the present invention are not limited to any particular data models for context graph 206. Schemas for objects need not be pre-determined, thereby allowing the system to persist, and also search for, objects with variable attributes in the same table or collection. The objects may be any type of object, including content objects, data objects, and/or graph constructs. Note that context graphs or subsets of context graphs can also be shared between users. The system may access a context graph for a user to generate messages for another user. In one embodiment, the system can manage context graphs with a large number of nodes using cross-module interconnections. The system can persist context graph 206 by transferring it to a backing storage (e.g., NoSQL database) when not in active use.

Each user in the messaging system is associated with a context graph instance. The system may stop a user session and persist the context graph instance when the user is inactive. The system reloads the context graph instance when the user session is restarted. When the system restarts the user session, the system processes the changes made to the context graph after the most recent reload. The system may reevaluate rules for the reloaded context graph, and the dependency system determines which rules in a relevant rule system are re-evaluated at the time that the user session is restarted and the context graph is reloaded.

Note that the system may also generate messages using incoming events that are not represented in context graph 206. For example, when a user makes a menu item selection, this is an event that might not trigger a change in context graph 206. However, rule-based recommender 216 may receive incoming events from collector/presenter 201 (shown as solid black line in FIG. 2) and generate messages using the events.

An implementation of the present invention may also include a graph application programming interface (API) to allow messaging servers to query and modify context graphs. Such messaging servers may modify the context graph by adding and/or removing nodes and edges. The messaging servers may also update attributes associated with nodes and edges. Further, the messaging servers may query the context graph to determine the existence of nodes and edges that are of a particular type, and that contain a particular set of attributes. The messaging servers may also batch together a number of updates at the same time.

The system can enter data into context graph 206 through subscriptions to publish/subscribe event system 203. Mapper/journal 214 maps events into semantic relationships in context graph 206 after receiving event information from publish/subscribe event system 203. For example, mapper/journal 214 may monitor event data for a number of page visit events related to the birth of a baby, and then create a link in context graph 206 indicating that the condition is likely to occur. The system may also include a learning mechanism that is part of mapper/journal 314 or that interacts with mapper/journal 314. The learning mechanism learns from past processing of event data input for graph modifications, in order to map the event input into semantic relationships in context graph 206. Such a learning mechanism may utilize any standard machine learning techniques, such as support vector machines. Collector/presenter 201 may also send and receive information directly to and from the context graph 206 using RESTful WebAPI 408.

Dependency system 210 connects rule-based recommender 216 to context graph 206 so that the system may notify rule-based recommender 216 of context graph changes. Changes to the data in context graph 206 can trigger changes and alerts via the dependency system 210. Dependency system 210 monitors changes made to context graph 206 as well as incoming events, and triggers re-evaluation of rules as required to update a message set. A message set is a set of weighted recommendable items. The message set is the result of messaging system 200 processing a rule set associated with the user.

Dependency system 210 determines events and changes to context graph 206 that trigger reevaluation of rules. Dependency system 210 can determine the properties and relationships in context graph 206 that each rule depends on. Such changes include topological changes and/or changes to individual properties on objects (e.g., nodes and edges) in context graph 206. The dependency system converts events and changes to context graph 206 into an internal event format. The dependency system inputs the events/changes into the individual rules that are dependent on the particular fields of the events/changes. In one embodiment, when the dependency system 210 detects context graph changes, the changes trigger rule-based recommender 216 to compute rankings and/or scores for recommendable items.

To build dependency system 210, the system processes rules and matches fields referenced by the rules against data in the context graph. Note that there is a unique dependency system 210 corresponding to each user's context graph. When the context graph is updated, the system also updates existing connections in dependency system 210 and dependency system 210 triggers evaluation of one or more rules. With dependency system 210, the system avoids large-scale reevaluation of the rules when events are detected or changes occur in the context graph.

The system can model alternative preferences for alternative message styles, and generate messages that present the same content in different ways. For example, the system may present the same content via different channels or frame the message in a different way. The system may frame messages as warnings or encouragements, since some people respond better to warnings and others respond to encouragements. For example, if the system observes that the user does not respond to an important message, the system may frame the message differently in order to elicit an appropriate response.

The system may include a state machine that describes the user's psychological state and past behaviors (e.g., the user is following savings advice and has clicked on links related to educational information). The system may update the state machine based on event data or other data. For example, the system may generate a sequence of related messages to suggest that a user perform an action. The system may track user responses to the related messages with the state machine. If a user continuously ignores a repeated message (possibly framed in different ways), the system can track the user responses with the state machine and infer that the user is non-responsive to certain types of message framing. The system may also generate new messages in response to observing that the user has performed certain actions or that the user has not responded to certain messages. The system can then update the context graph using the state machine updates, potentially triggering additional messages.

Embodiments of the present invention may also include a dialog system. The system may engage in a dialog with a user to persuade the user to take a beneficial course of action. Based on user dialog responses as well as their observed behavior, the system may verify assertions about user behavior, refine the user model and update context graph 206, and generate suggestions for the user. Note that the system may also engage in a dialog with the user using the state machine. As a user progresses through the dialog, the system updates the state of the state machine, and the system may also use the results to update the context graph.

The system includes APIs for updating user records and rules. Embodiments of the present invention may include a RuleAPI for updating rules in the system, and a UserAPI for updating user records. The system can address APIs through a RESTful WebAPI, or via messages injected into the message queuing system (e.g., RabbitMQ).

An embodiment of the present invention may include a RuleAPI for creating and updating rule sets, and for binding the rule sets to groups. The RuleAPI may call dependency system 210 to update rules. The RuleAPI also allows for adding users to groups. Various implementations may include a content editing system to allow editing specifications for rule sets and groups.

Messaging system 200 may maintain its own internal user record storage system, which facilitates persistently identifying users via the userid. In one implementation, the UserAPI includes functions for the management of user-related data, including context graph data, and other persistent information in the system. The UserAPI supports functions that include CreateUser, UpdateUser, RemoveUser, StartUser, and StopUser.

The system may call the function CreateUser to create a new user, which returns a userid that is passed to collector/presenter 201. Collector/presenter 201 may use the userid to refer to the user in the messaging system. Various implementations of the system may omit storing or using personally identifiable data, such as a user's name, for security purposes.

The system may update user information for a particular user by calling an UpdateUser function. With the UpdateUser function, the system can update the serialized context graph 206, group membership information, etc. The UpdateUser function updates persistent user information and the messaging system marks the user information as updated. Note that with the UpdateUser function, the system does not update messages, nor does the system deserialize the user into memory.

The system may call the function RemoveUser to remove a user from persistent storage. This deletes the context graph and other information associated with the user.

The system may call the function StartUser to initiate a user session. The system loads into a server's memory a complete semantic representation for a user, including the user's context graph and other information. The StartUser function returns a session key, which may be used by callers to refer to the user session in subsequent calls. The session key may be used to query a server for the location in the system of an executing user session instance. Note that the system need not load user information into memory to update user data. The system may make changes to the user information in persistent storage, and the system may process the changes the next time the system loads the user information into memory.

The system may call the function StopUser to terminate a user session, deallocate a user from server memory and serialize their representation back into storage. The session key for user becomes invalid and the user information is no longer in server memory. The user information is only present as serialized object data in a database.

Exemplary Process for Generating a Message

Figure 3:
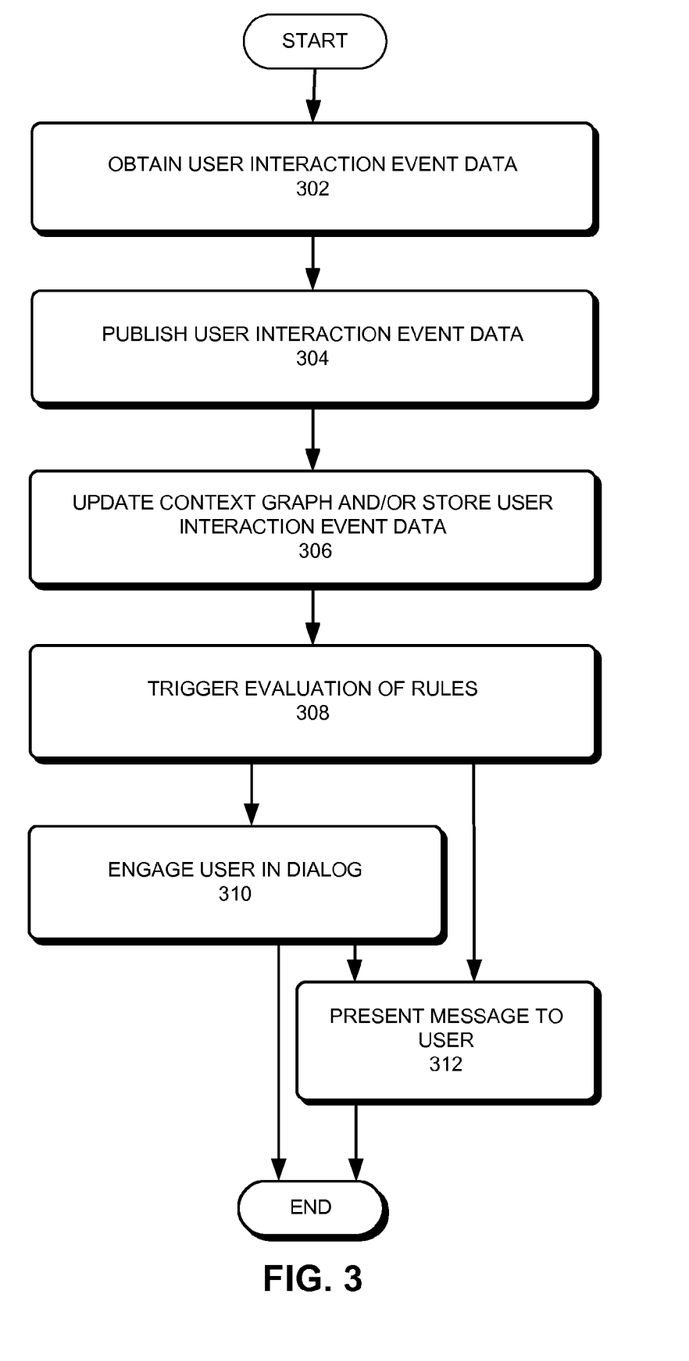
FIG. 3 presents a flowchart illustrating an exemplary process for generating a message, according to an embodiment.

FIG. 3 presents a flowchart illustrating an exemplary process for generating a message, according to an embodiment. During operation, messaging server 200 initially obtains user interaction event data (operation 302). For example, messaging server 200 may obtain event data relating to the user's webpage browsing activities on an enterprise's human resource website. Messaging system 200 may obtain event data when collector/presenter 201 sends event data to messaging server 200. Messaging system 200 then publishes the user interaction event data (operation 304). In a messaging system with multiple messaging servers executing concurrently, messaging server 200 determines whether it is managing the user session of the user associated with the event data. If the user session is being managed by messaging server 200, then messaging server 200 may update context graph 206 and/or store user interaction event data in low-level event history database 207 (operation 306). Note that messaging server 200 may update context graph 206 by learning from previous processing of event data.

The events and/or changes to context graph 206 may cause dependency system 210 to fire one or more rules (operation 308). Note that to fire the rules, messaging server 200 may determine the user group that the user is associated with, and then determine the set of rules associated with the user group. Messaging server 200 queries context graph 206 and evaluate events with the set of rules to generate a message. Messaging server 200 may engage the user in a dialog (operation 310). Messaging server 200 may modify context graph 206 based on responses from the user in the dialog. Messaging server 200 then communicates the message to collector/presenter 201, which presents the message to the user (operation 312). Note that messaging server 200 may also communicate the message to collector/presenter 201 for presentation to the user without engaging the user in dialog.

In some embodiments, collector/presenter 201 may retrieve the message either asynchronously or asynchronously from messaging server 200. Collector/presenter 201 may poll messaging system 200 using a Web API to obtain a current list of messages. To obtain real-time message updates, the collector/presenter 201 may also subscribe to an output channel. The system may publish both real-time and non-real-time message updates into the output channel. The system may also persist the messaging system output, so that the output is available even when the user is not logged in. In one embodiment, collector/presenter 201 can cause messaging system 200 to load a user, then input user interaction events into the messaging system and asynchronously retrieve message data.

Figure 4:
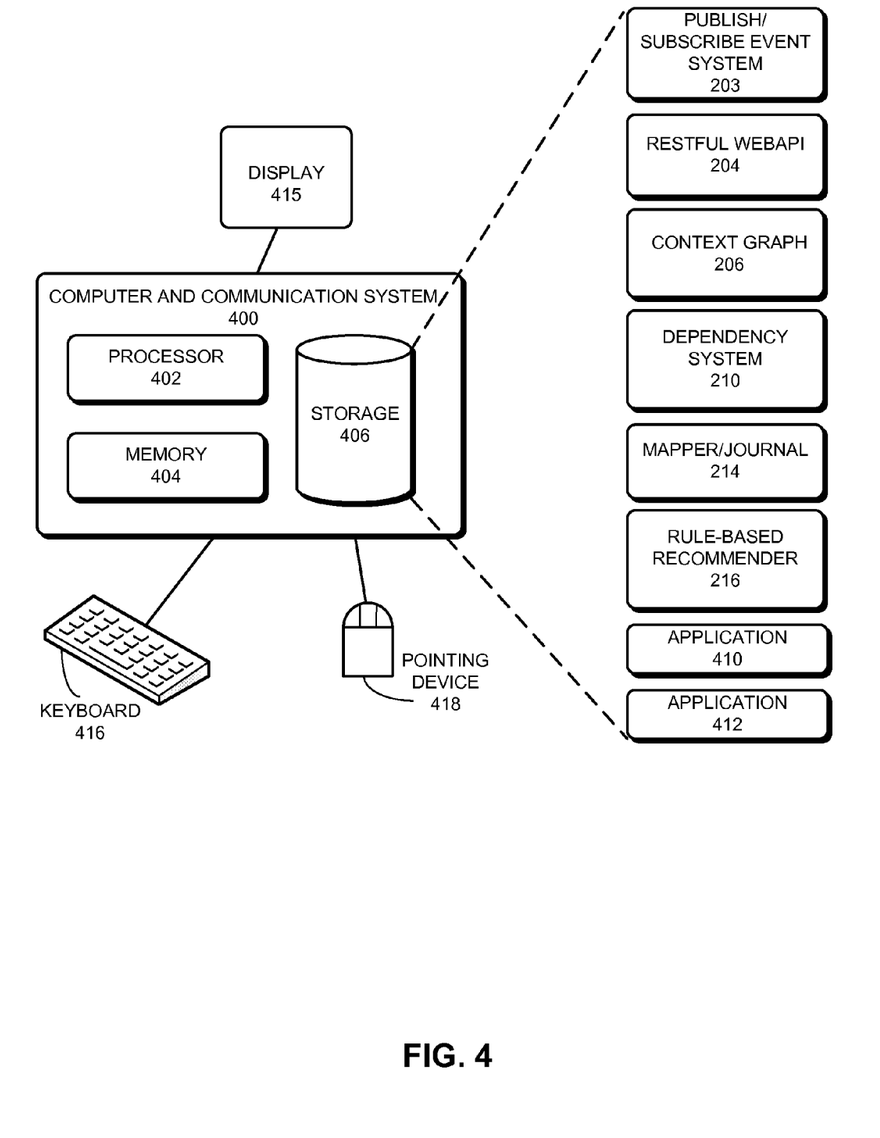
FIG. 4 illustrates an exemplary implementation of a message system, in accordance with one embodiment of the present invention.

FIG. 4 illustrates an exemplary implementation of a message system, in accordance with one embodiment of the present invention. In one embodiment, a computer and communication system 400 includes a processor 402, a memory 404, and a storage device 406. Storage device 406 stores a number of applications, such as applications 410 and 412. Storage device 406 also stores publish/subscribe event system 203, RESTful WebAPI 204, context graph 206, dependency system 210, mapper/journal 214, and rule-based recommender 216. During operation, one or more applications are loaded from storage device 406 into memory 404 and then executed by processor 402. While executing the program, processor 402 performs the aforementioned functions. Computer and communication system 400 is coupled to an optional display 415, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method performed by a messaging server to generate a message, comprising:
   receiving, by a computing device over a computer network, a hypertext transfer protocol (HTTP) request from a web application and/or a mobile application presented on a client device;
   obtaining, from the HTTP request, user interaction event data that describes explicit or implicit interactions of a user with a page of the web application and/or the mobile application being viewed by the user;
   updating a context graph associated with the user based on the user interaction event data, wherein the context graph includes information about the user's state, behavior and/or interests with pages of the web application and/or the mobile application;
   determining a set of rules associated with a modification to the context graph, wherein a respective rule in the set of rules takes elements of the context graph as input, and is associated with a group of users that includes the user;

processing a conditional statement of the respective rule based on the context graph; and responsive to determining that the respective rule's condition statement is satisfied, generating a message that includes a recommendation associated with the rule.

2. The method of claim 1, further comprising:
generating a sequence of related messages that suggest a user perform an action;
tracking user responses to the related messages with a state machine;
generating a new message based on the tracked user responses and the state of the user's context graph; and
updating the context graph using data from the state machine.

3. The method of claim 1, further comprising:
selecting a message item associated with the set of rules; and
generating the message based on the selected message item.

4. The method of claim 1, wherein the message is retrieved by a collector/presenter and ranked with other messages to facilitate choosing a message for presentation to the user.

5. The method of claim 1, wherein the method further comprises:
receiving the user interaction event data from a collector/presenter that monitors explicit or implicit user interactions with the web application and/or mobile application.

6. The method of claim 1, further comprising:
sending a series of related messages to the user;
engaging the user in a dialog;
updating the context graph with data from the dialog and/or modifies the message based on the dialog and state of the user's context graph.

7. The method of claim 1, wherein the rules are conditional statements referencing nodes and edges of the context graph.

8. A non-transitory computer-readable storage medium storing instructions that when executed by a computer cause the computer to perform a method for generating a message, the method comprising:
receiving, over a computer network, a hypertext transfer protocol (HTTP) request from a web application and/or a mobile application presented on a client device;
obtaining, from the HTTP request, user interaction event data that describes explicit or implicit interactions of a user with a page of the web application and/or the mobile application being viewed by the user;
updating a context graph associated with the user based on the user interaction event data, wherein the context graph includes information about the user's state, behavior, and/or interests with pages of the web application and/or the mobile application;
determining a set of rules associated with a modification to the context graph, wherein a respective rule in the set of rules takes elements of the context graph as input, and is associated with a group of users that includes the user;
processing a conditional statement of the respective rule based on the context graph; and
responsive to determining that the respective rule's condition statement is satisfied, generating a message that includes a recommendation associated with the rule.

9. The non-transitory computer-readable storage medium of claim 8, wherein the computer-readable storage medium stores additional instructions that, when executed, cause the computer to perform additional steps comprising:
generating a sequence of related messages that suggest a user perform an action;
tracking user responses to the related messages with a state machine;
generating a new message based on the tracked user responses and the state of the user's context graph; and
updating the context graph using data from the state machine.

10. The non-transitory computer-readable storage medium of claim 8, wherein the computer-readable storage medium stores additional instructions that, when executed, cause the computer to perform additional steps comprising:
selecting a message item associated with the set of rules; and
generating the message based on the selected message item.

11. The non-transitory computer-readable storage medium of claim 8, wherein the message is retrieved by a collector/presenter and ranked with other messages to facilitate choosing a message for presentation to the user.

12. The non-transitory computer-readable storage medium of claim 8, wherein the computer-readable storage medium stores additional instructions that, when executed, cause the computer to perform additional steps comprising:
receiving the user interaction event data from a collector/presenter that monitors explicit or implicit user interactions with the web application and/or mobile application.

13. The non-transitory computer-readable storage medium of claim 8, wherein the computer-readable storage medium stores additional instructions that, when executed, cause the computer to perform additional steps comprising:
sending a series of related messages to the user;
engaging the user in a dialog;
updating the context graph with data from the dialog and/or modifies the message based on the dialog and state of the user's context graph.

14. The non-transitory computer-readable storage medium of claim 8, wherein the rules are conditional statements referencing nodes and edges of the context graph.

15. A computing system for generating a message, the system comprising:
one or more processors,
a computer-readable medium coupled to the one or more processors having instructions stored thereon that, when executed by the one or more processors, cause the one or more processors to perform operations comprising:
receiving, over a computer network, a hypertext transfer protocol (HTTP) request from a web application and/or a mobile application presented on a client device:
obtaining, from the HTTP request, user interaction event data that describes explicit or implicit interactions of a user with a page of the web application and/or the mobile application being viewed by the user;
updating a context graph associated with the user based on the user interaction event data, wherein the context graph includes information about the user's state, behavior, and/or interests with pages of the web application and/or the mobile application;
determining a set of rules associated with a modification to the context graph, wherein a respective rule in the set of rules takes elements of the context graph as input, and is associated with a group of users that includes the user;

processing a conditional statement of the respective rule based on the context graph; and responsive to determining that the respective rule's condition statement is satisfied, generating a message that includes a recommendation associated with the rule.

16. The computing system of claim 15, wherein the computer-readable storage medium stores additional instructions that, when executed, cause the one or more processors to perform additional steps comprising:

generating a sequence of related messages that suggest a user perform an action;

tracking user responses to the related messages with a state machine;

generating a new message based on the tracked user responses and the state of the user's context graph; and updating the context graph using data from the state machine.

17. The computing system of claim 15, wherein the computer-readable storage medium stores additional instructions that, when executed, cause the one or more processors to perform additional steps comprising:

selecting a message item associated with the set of rules; and generating the message based on the selected message item.

18. The computing system of claim 15, wherein the message is retrieved by a collector/presenter and ranked with other messages to facilitate choosing a message for presentation to the user.

19. The computing system of claim 15, wherein the method further comprises:

receiving the user interaction event data from a collector/presenter that monitors explicit or implicit user interactions with the web application and/or mobile application.

20. The computing system of claim 15, wherein the computer-readable storage medium stores additional instructions that, when executed, cause the computing system to perform additional steps comprising:

sending a series of related messages to the user;

engaging the user in a dialog;

updating the context graph with data from the dialog and/or modifies the message based on the dialog and state of the user's context graph.

* * * * *